US005420773A

United States Patent [19]

Huang

[11] Patent Number: 5,420,773

[45] Date of Patent: May 30, 1995

[54] BUILT-UP TABLE LAMP STRUCTURE

[76] Inventor: James C. S. Huang, No. 19, Lane 111, Ho Ping Rd., Louchou, Taipei Hsien, Taiwan, Prov. of China

[21] Appl. No.: 293,299

[22] Filed: Aug. 22, 1994

[51] Int. Cl.[6] .................................................. F24S 4/42

[52] U.S. Cl. .................................... 362/410; 362/352; 362/414; 362/806

[58] Field of Search ............... 362/351, 352, 355, 356, 362/358, 410, 414, 450, 452, 457, 806

[56] References Cited

U.S. PATENT DOCUMENTS

| | | | |
|---|---|---|---|
| 2,748,257 | 5/1956 | Bennett | 362/806 |
| 2,813,053 | 11/1957 | Tuomala | 362/351 |
| 4,747,031 | 5/1988 | Huang | 362/358 |

FOREIGN PATENT DOCUMENTS

| | | | |
|---|---|---|---|
| 726518 | 3/1932 | France | 362/450 |
| 460916 | 1/1951 | Italy | 362/355 |

*Primary Examiner*—Ira S. Lazarus
*Assistant Examiner*—Y. Quach
*Attorney, Agent, or Firm*—Bacon & Thomas

[57] ABSTRACT

A built-up table lamp includes a lamp stand formed by bending a fan-like sheet of flexible material to define a truncated-conic structure having a larger lower end standing on table and a small upper end to support a bulb socket assembly. An inner truncated-cone is received within the upper end of the lamp stand and an outer truncated-cone is fit over the upper end of the lamp stand to sandwich therebetween the upper end of the lamp stand. The bulb socket assembly includes a socket having a threaded tube mounted to the bottom thereof to insert through holes formed on the truncated-cones to be secured thereon by a nut. A lamp shade is formed by bending a fan-like sheet of flexible material to define a truncated-conic structure. The lamp shade has a plurality of holes formed thereon to receive and nut-secure thereon a threaded end of each of a plurality of harp rods of which the other ends are threadingly engaged to inner-threaded holes formed on a ring. The ring is disposed and thus supported on a circumferential flange formed on the socket. A light bulb is inserted into the socket and electricity is supplied thereto by means of a power cord extending through the tube and the lamp stand to be connectable to an external power source.

8 Claims, 4 Drawing Sheets

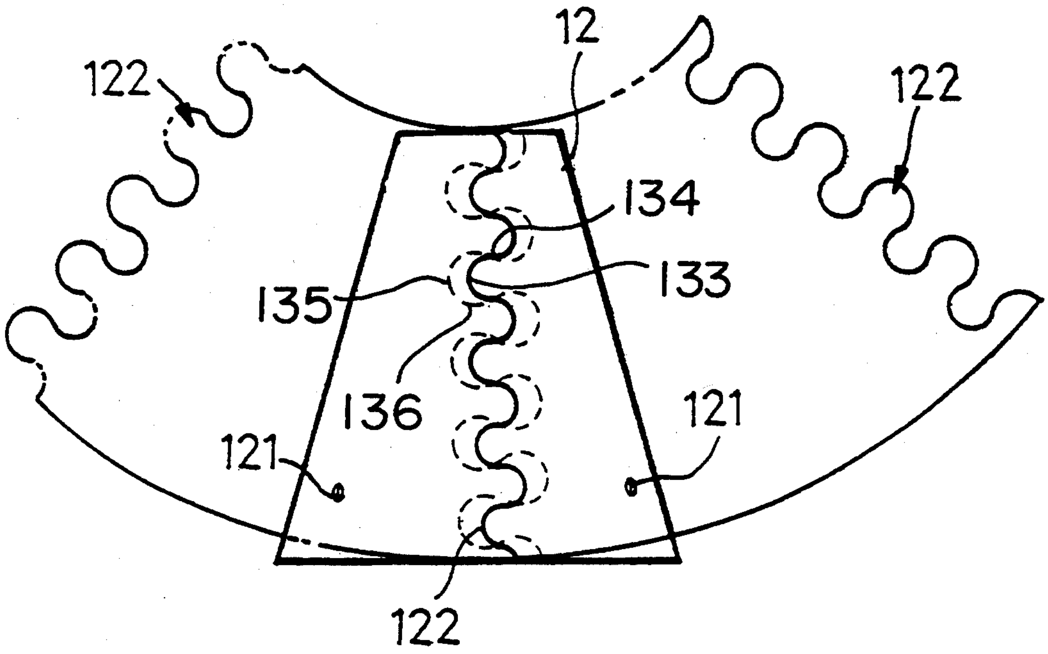
FIG. 3
FIG. 4
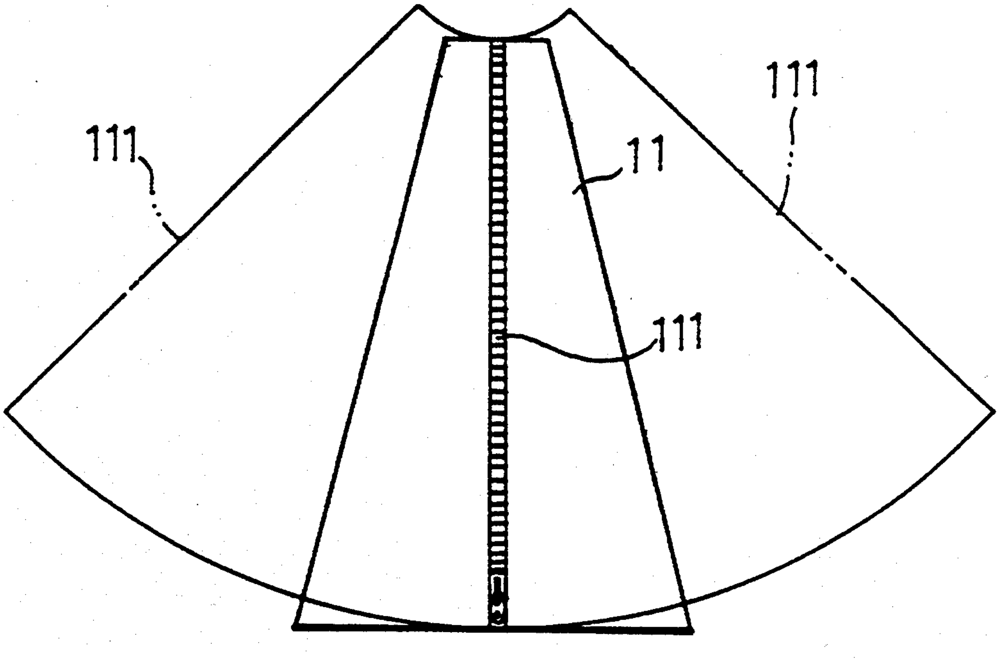

BUILT-UP TABLE LAMP STRUCTURE

FIELD OF THE INVENTION

The present invention relates generally to a table lamp and in particular to a built-up table lamp structure which provides easy and convenient user assembly/-disassembly and also space saving for storage and transportation.

BACKGROUND OF THE INVENTION

Table lamps are commonly used in living rooms or offices. Table lamps generally comprise a stand on which a bulb socket assembly is mounted. The bulb socket assembly comprises a socket electrically connected to an external power source with a power cord connected therebetween and a light bulb mounted on the socket. A lamp shade is used to cover the bulb for softening the light and decoration. Conventionally, the lamp shade and stand have fixed shape and configuration so that in storage and transportation, they occupy a great space.

It is therefor desirable to provide a table lamp structure which is capable to save the space occupied thereby during storage and transportation so as to overcome the above drawback.

SUMMARY OF THE INVENTION

The principal object of the invention is to provide a table lamp structure wherein the lamp shade and lamp stand are made of flexible material sheets, generally in the form of a fan, which provide space saving for storage and transportation while allows the lamp shade and lamp stand to be formed in an easy manner by having the fan-like sheets bent to have the side edges thereof jointed together to define truncated-conic structures.

It is another object of the present invention to provide a built-up table lamp structure of which all parts are releasably secured so that with common hand tools, a person can easily have the parts assembled to complete the formation of the table lamp.

In accordance with the present invention, there is provided with a built-up table lamp comprising a lamp stand formed by bending a fan-like sheet of flexible material to define a truncated-conic structure having a larger lower end standing on table and a small upper end to support a bulb socket assembly. An inner truncated-cone is received within the upper end of the lamp stand and an outer truncated-cone is fit over the upper end of the lamp stand to sandwich therebetween the upper end of the lamp stand. The bulb socket assembly comprises a socket having a threaded tube mounted to the bottom thereof to insert through holes formed on the truncated-cones to be secured thereon by a nut. A lamp shade is formed by bending a fan-like sheet of flexible material to define a truncated-conic structure. The lamp shade has a plurality of holes formed thereon to receive and nut-secure thereon a threaded end of each of a plurality of harp rods of which the other ends are threadingly engaged to inner-threaded holes formed on a ring. The ring is disposed and thus supported on a circumferential flange formed on the socket. A light bulb is inserted into the socket and electricity is supplied thereto by means of a power cord extending through the tube and the lamp stand to be connectable to an external power source.

BRIEF DESCRIPTION OF THE DRAWINGS

The structure, features and other objects, functions and techniques of the present invention will be better understood from the following description of a preferred embodiment thereof with reference to the attached drawings, wherein:

FIG. 3 is a developmental view of the lamp shade sheet member of the table lamp shown in FIG. 1;

FIG. 4 is a developmental view of the lamp stand sheet member of the table lamp shown in FIG. 1.

DETAILED DESCRIPTION OF THE PREFERRED EMBODIMENT

Figure 1:
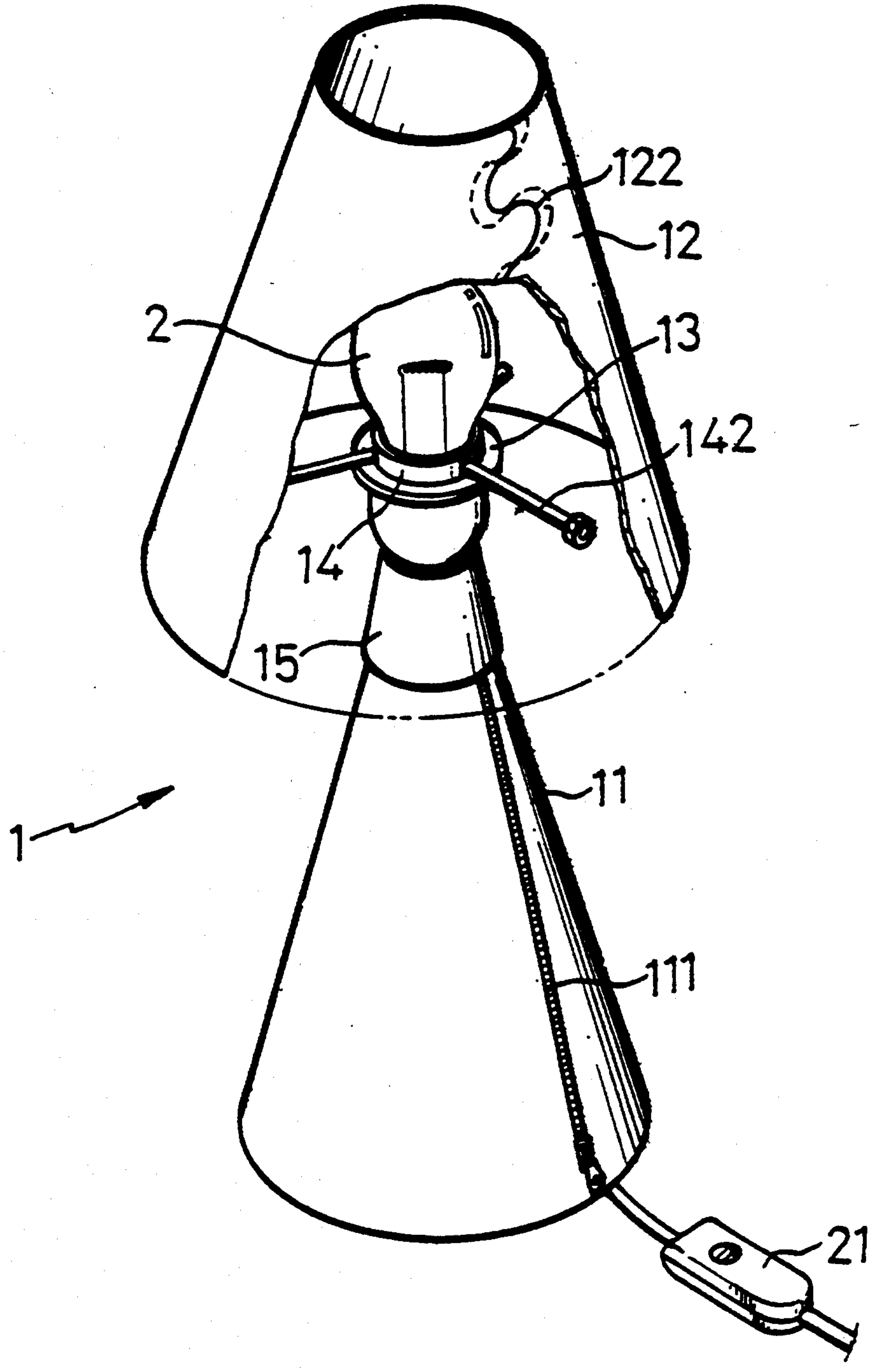
FIG. 1 is a perspective view showing a built-up table lamp constructed in accordance with the present invention, with the lamp shade partially broken to illustrate inside structure.
Figure 2:
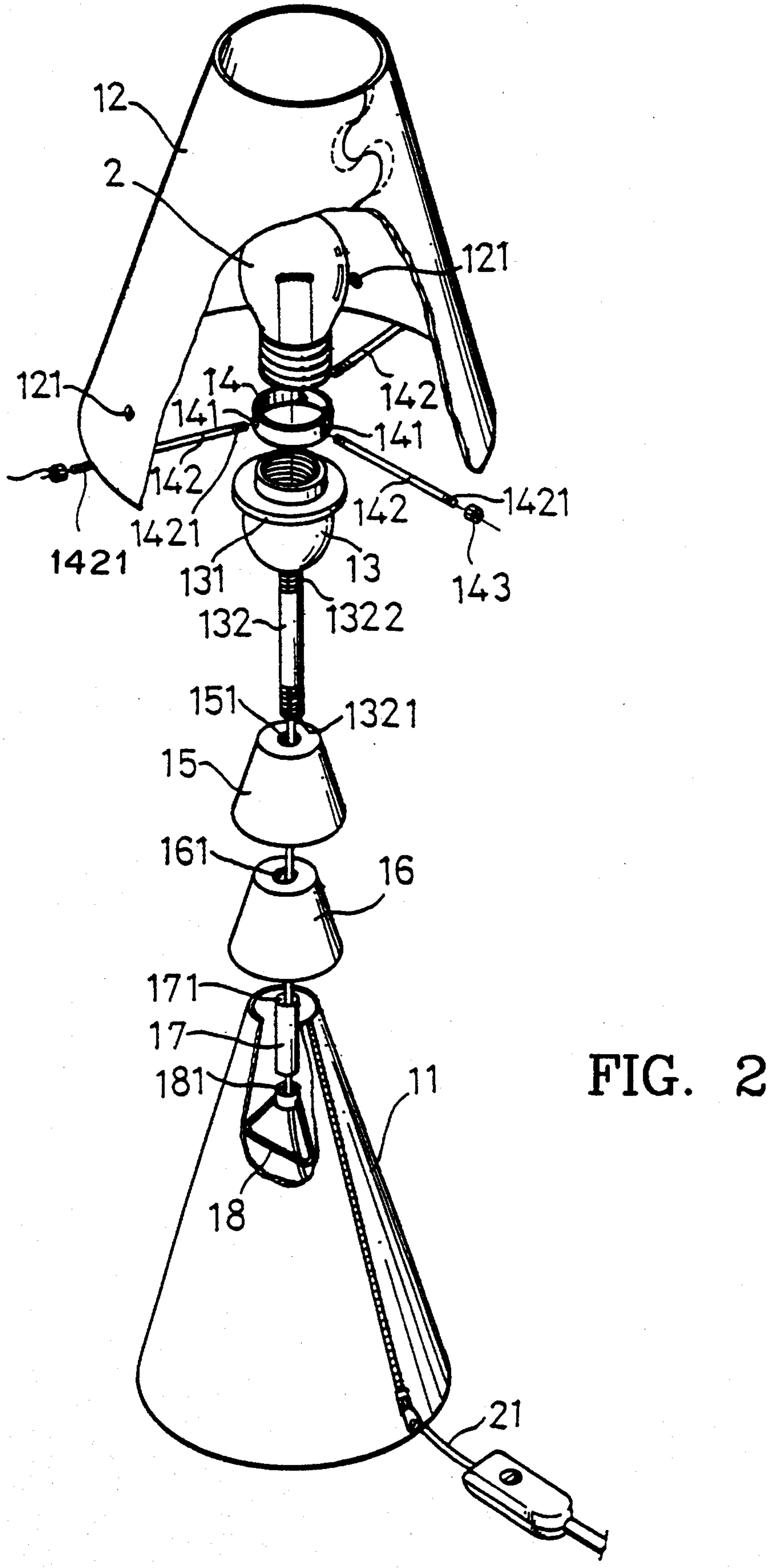
FIG. 2 is an exploded perspective view of the built-up table lamp shown in FIG. 1.
Figure 5:
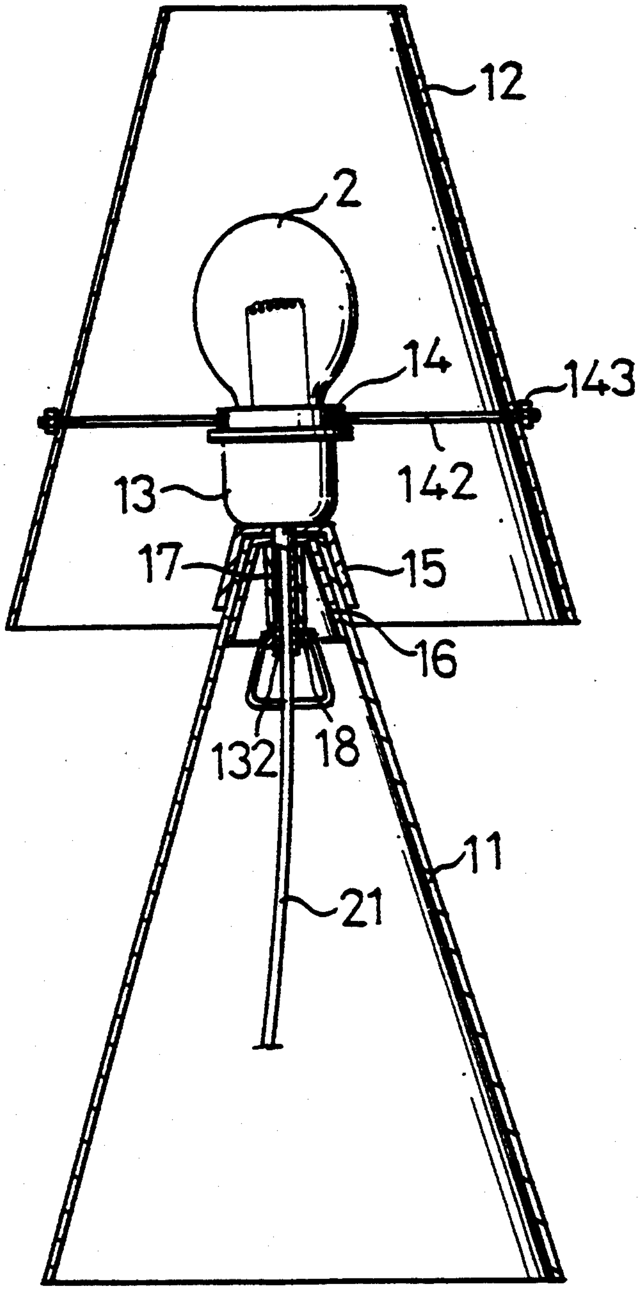
FIG. 5 is a cross-sectional view of the table lamp shown in FIG. 1.

With reference to the drawings and in particular FIGS. 1, 2 and 5, wherein a built-up table lamp constructed in accordance with the present invention, generally designated with the reference numeral 1, is shown, the table lamp 1 comprises generally a truncated-conic lamp stand 11 on which a bulb socket assembly, comprising a light bulb 2 releasably inserted in a socket 13, is removably mounted with a truncated-conic lamp shade 12 disposed thereon to cover the bulb 2.

In accordance with an aspect of the present invention, the lamp shade 12 comprises a fan-like sheet member of flexible material, as shown in FIG. 3, which has two opposite lateral sides, each having a wavy edge constituted by alternating recessed portions and raised portions, each of the recessed portions having an expanded bottom 133 and a reduced neck 134, and each of the raised portions having an expanded tip 135 and a reduced connection 136 with the wavy edge. The arrangement of the wave on one of the side edges is alternate relative to that of the other so that when the sheet member is bent to form a truncated-cone with the wavy edges 122 thereof mating each other by having the raised portions of one of the wavy edges 122 engage the corresponding recessed portions of the other wavy edge 122 and having the expanded tips of one of the wavy edges 122 nipped in the corresponding reduced neck of the other wavy edge 122. This allows the truncated-conic lamp shade 12 to be formed and maintained.

On the lamp shade 12 so formed, a plurality of holes 121 are provided, preferably in an equal spaced manner, along a circumferential direction. Preferably, there are three such holes 121 formed on the lamp shade 12.

The lamp stand 11 is formed by bending a fan-like thin sheet member of a flexible material which has two lateral side edges, each having securing means 111 mounted thereto, as shown in FIG. 4, to provide a truncated-conic structure by having the side edges secured together by the engagement of the securing means 111. In the preferred embodiment, the securing means 111 comprises zipper. It is, however, apparent to use fastener or securing means of other kinds to replace the zipper 111, such as loop-hook type fastener which is also referred to as Velcro, releasable adhesive, snap and so on.

The lamp stand 11, which is so formed as a truncated-conic member, comprises a large diameter lower end adapted to stand on a table or a fixture (not shown) and an opposite small diameter upper end on which the bulb socket assembly is removably mounted. An outer truncated-cone 15 and an inner truncated-cone 16 are respective fit over and received within the upper end of the lamp stand 11. Each of the truncated-cones 15 and 16 has a central hole 151 or 161 in registration with each other.

As mentioned previously, the bulb socket assembly comprises a socket 13 having a tube 132 mounted to a bottom side thereof to be inserted through the central holes 151 and 161 of the truncated-cones 15 and 16. The tube 132 has a diameter smaller than the bottom side of the socket 13 so as to define a circumferential shoulder around the connection between the socket 13 and the tube 132 so as to allow the socket 13 to be supported on the outer truncated-cone 15. The tube 132 has externally-threaded ends 1322 and is inserted through the truncated-cones 15 and 16 to have the lower one (as viewed in the drawings) of the threaded ends 1322 secured inside the inner truncated-cone 16 by a nut, preferably a butterfly nut 18, which has an inner thread engageable with the threaded lower end of the tube 132. It is apparent that the truncated-cones 15 and 16 has substantially the same taper as the truncated-conic lamp stand 11.

In the embodiment illustrated, a tubular member 17 which has a central hole 171 fittable over the tube 132 is disposed between the nut 18 and the inner truncated-cone 16 to enhance easy securing of the socket 13, as well as the truncated-cones 15 and 16, on the upper end of the lamp stand 11.

The socket 13 comprises a circumferential flange 131 on which a ring 14 is supported. The ring 14 comprises a plurality of inner-threaded holes 141, each corresponding a respective one of the holes 121 formed on the lamp shade 12 and, a plurality of harp rods 142 which has threaded opposite ends 1421, one of the threaded ends threadingly engaged with the inner threaded hole of the ring. The other threading end 1421 of each of the harp rod 142 extends radially from the ring 14, through the respective hole 121 of the lamp shade 12 to be secured thereto by a nut 143 so as to allow the lamp shade 12 to be supported on the socket 13 and thus the lamp stand 11.

A power cord 21 has one end extending through a central hole 1321 of the tube 132 to electrically connect to the socket 13 for supplying electricity to the bulb 2 mounted in the socket 13 and an opposite end extending through the butterfly nut 18 and the lower end of the lamp stand 11 to connect to an external power source.

In forming the built-up table lamp 1 of the present invention, the lamp shade 12 and the lamp stand 11 are formed first by bending the sheet members thereof to have the lateral side edges jointed to provide the truncated-conic structure. The inner truncated-cone 16 is inserted into the lamp stand 11 to be located within the upper end of the lamp stand 11 with the power cord 21 extending therethrough. The outer truncated-cone 15 is then fit over the upper end of the lamp stand 11 with the power cord 21 extending through the hole 151 thereof. The threaded tube 132 inserted through the holes 151 and 161 of the truncated-cones 15 and 16, with the power cord 21 extending through the central hole 1321 thereof, and secured on the truncated-cones 15 and 16 by the butterfly nut 18 and, if necessary, with the help of the tubular member 17. The socket 13 is now disposed to be on the lamp stand 11. The harp rods 142 are threadingly secured to the ring 14 with one end thereof and the other end of the harp rods 142 extends through the holes 121 of the lamp shade 12 and secured thereto by the nuts 143. The ring 14 with the harp rods 142 and the lamp shade 12 secured thereto is disposed and thus supported on the circumferential flange 131 of the socket 13. The light bulb 2 can then be inserted into the socket 13.

It is apparent that although the invention has been described in connection with the preferred embodiment, it is contemplated that those skilled in the art may make changes to the preferred embodiment without departing from the scope of the invention as defined in the appended claims.

What is claimed is:

1. A table lamp structure comprising:
   - a lamp stand formed by bending a first fan-like sheet of flexible material having two opposite lateral side edges with mutually engageable first releasable securing means mounted thereon into a first truncated-conic structure having a taper by jointing the first releasable securing means together, said truncated-conic lamp stand comprising a large lower end adapted to stand on a support surface and a small upper end having a hole therein;
   - an inner truncated-cone having a taper substantially equal to the taper of the lamp stand and received within the upper end of the lamp stand and an outer truncated-cone having a taper substantially equal to the taper of the lamp stand and fit over the upper end of the lamp stand to sandwich the upper end of the lamp stand therebetween, each of the inner and outer truncated-cones having a central hole;
   - a bulb socket assembly comprising a socket into which a light bulb is releasably insertable, a tube mounted to a bottom side of the socket and extending through the central holes of the inner and outer truncated-cones and the hole of the upper end to enter the lamp stand and secured therein by first releasable fastening means, the socket comprising a circumferential flange formed thereon;
   - a power cord having a first end extending through the tube to electrically connect to the socket and the light bulb and a second end extending out of the lamp stand to be adapted to connect an external power source;
   - a lamp shade formed by bending a second fan-like sheet of flexible material having two opposite lateral side edges with mutually engageable second releasable securing means mounted thereon into a second truncated-conic structure by jointing the second releasable securing means together; and
   - lamp shade support means comprising a ring disposed and supported on the circumferential flange of the socket and a plurality of harp rods each having first end releasably mounted to the ring by second releasable fastening means and, and said rods extending radially from the ring to have their second ends secured to the lamp shade by third releasable fastening means.

2. The table lamp structure as claimed in claim 1, wherein the first releasable fastening means comprises an external thread formed on the tube and a nut engageable with the external thread of the tube to secure the externally-threaded tube in the inner and outer truncated-cones.

3. The table lamp structure as claimed in claim 2, wherein the first releasable fastening means further comprises a tubular member fit over the externally-threaded tube and located between the nut and the inner truncated-cone.

4. The table lamp structure as claimed in claim 2, wherein the nut is a butterfly nut.

5. The table lamp structure as claimed in claim 1, wherein the second releasable fastening means comprises a plurality of inner-threaded holes formed on the ring and the first end of each of the harp rods comprises an external thread to engage the respective inner-threaded hole of the ring.

6. The table lamp structure as claimed in claim 1, wherein the third releasable fastening means comprises a plurality of holes formed on the lamp shade to allow the second end of the respective harp rod to extend therethrough and second end of each of the harp rods comprises an external thread extending through the respective hole of the lamp shade and secured thereon by nut.

7. The table lamp structure as claimed in claim 1, wherein the first releasable securing means comprises a zipper mounted along the lateral side edges of the first fan-like sheet member.

8. The table lamp structure as claimed in claim 1, wherein the second releasable securing means comprises a wavy edge formed on each of the side edges of the second fan-like sheet member, the wavy edge being constituted by alternating recessed portions and raised portions, each of the recessed portions having an expanded bottom and a reduced neck, and, each of the raised portions having an expanded tip and a reduced connection with the wavy edge, the wave of one of the side edges being alternate relative to that of the other side edge so that when the second fan-like sheet member is bent to form the truncated-conic structure with the wavy edges thereof mating with each other by having the raised portions of one of the wavy edges engage the corresponding recessed portions of the other wavy edge and having the expanded tips of one of the wavy edges nipped in the corresponding reduced necks of the other wavy edge.

* * * * *